United States Patent [19]
Ohshima et al.

[11] Patent Number: 6,029,613
[45] Date of Patent: Feb. 29, 2000

[54] VISCOUS LIQUID HEATER

[75] Inventors: Toshihiro Ohshima, Nagoya; Masaru Tsunokawa, Okazaki; Sadahisa Onimaru, Chiryu; Mikio Matsuda; Mitsuo Inagaki, both of Okazaki, all of Japan

[73] Assignee: Denso Corporation, Kariya, Japan

[21] Appl. No.: 09/148,924

[22] Filed: Sep. 4, 1998

[30] Foreign Application Priority Data

Sep. 5, 1997 [JP] Japan ................................ 9-241474
Jul. 21, 1998 [JP] Japan ................................ 10-205471

[51] Int. Cl.[7] ..................................................... F22B 3/06
[52] U.S. Cl. ............................................. 122/26; 126/247
[58] Field of Search ............................... 122/26; 126/247; 237/12.3 B, 12.3 R

[56] References Cited

U.S. PATENT DOCUMENTS

| 4,733,635 | 3/1988 | Menard et al. | 122/26 |
|---|---|---|---|
| 4,773,388 | 9/1988 | Herbulot et al. | 122/26 |
| 4,974,778 | 12/1990 | Bertling . | |
| 4,993,377 | 2/1991 | Itakura . | |
| 5,573,184 | 11/1996 | Martin . | |
| 5,752,499 | 5/1998 | Mori et al. | 126/247 |
| 5,755,379 | 5/1998 | Ito | 237/12.3 R |

FOREIGN PATENT DOCUMENTS 5-8633  1/1993  Japan .

Primary Examiner—Teresa Walberg
Assistant Examiner—Jiping Lu
Attorney, Agent, or Firm—Harness, Dickey & Pierce, PLC

[57] ABSTRACT

A viscous liquid heater is composed of a housing having a heat chamber filled with viscous liquid, a rotor disposed in the heat chamber and a rotary plate movable to change volume of the heat chamber. The rotor rotates in the heat chamber and shears the viscous liquid to generate heat. The temperature of the heat chamber is controlled by changing volume of the heat chamber.

15 Claims, 13 Drawing Sheets

VISCOUS LIQUID HEATER

CROSS REFERENCE TO RELATED APPLICATION

The present application is based on and claims priority from Japanese Patent Applications Hei 9-241474 filed on Sep. 5, 1997, and Hei 10-205471 filed on Jul. 21, 1998, the contents of which are incorporated herein by reference.

BACKGROUND OF THE INVENTION

1. Field of the Invention

The present invention relates to a viscous liquid heater using viscous liquid and a rotor to convert rotation energy into thermal energy.

2. Description of the Related Art

A viscous liquid heater for a vehicle is disclosed in U.S. Pat. No. 4,993,377 or JP-A-2-246823. However, it is necessary to provide an electromagnetic clutch to control a rotor of the viscous heater to generate heat. This requires considerable space of the vehicle to install such a heater, and heat generation control according to various conditions is very difficult.

JP-A5-8633 discloses another viscous liquid heater which has a viscous liquid joint section and a compressor section installed in a unit. Although the liquid joint section is used as a heater section when the compressor is stopped, it is impossible to operate both the heater section and the compressor section for a dehumidification. It is also difficult to control temperature of the heater section according to various conditions.

SUMMARY OF THE INVENTION

Therefore, a main object of the present invention is to provide an improved viscous liquid heater that can be controlled according to various conditions without addition to a considerably large space to install the same.

According to a main aspect of the present invention, a viscous liquid heater is composed of a housing having a heat chamber containing viscous liquid, a rotor disposed in the heat chamber, and means for changing volume of the heat chamber according to various conditions.

If gas-mixed liquid or a mixture of viscous liquid material and gas is filled in the heat chamber of the above viscous liquid heater, abrupt change in the heat generation can be moderated.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
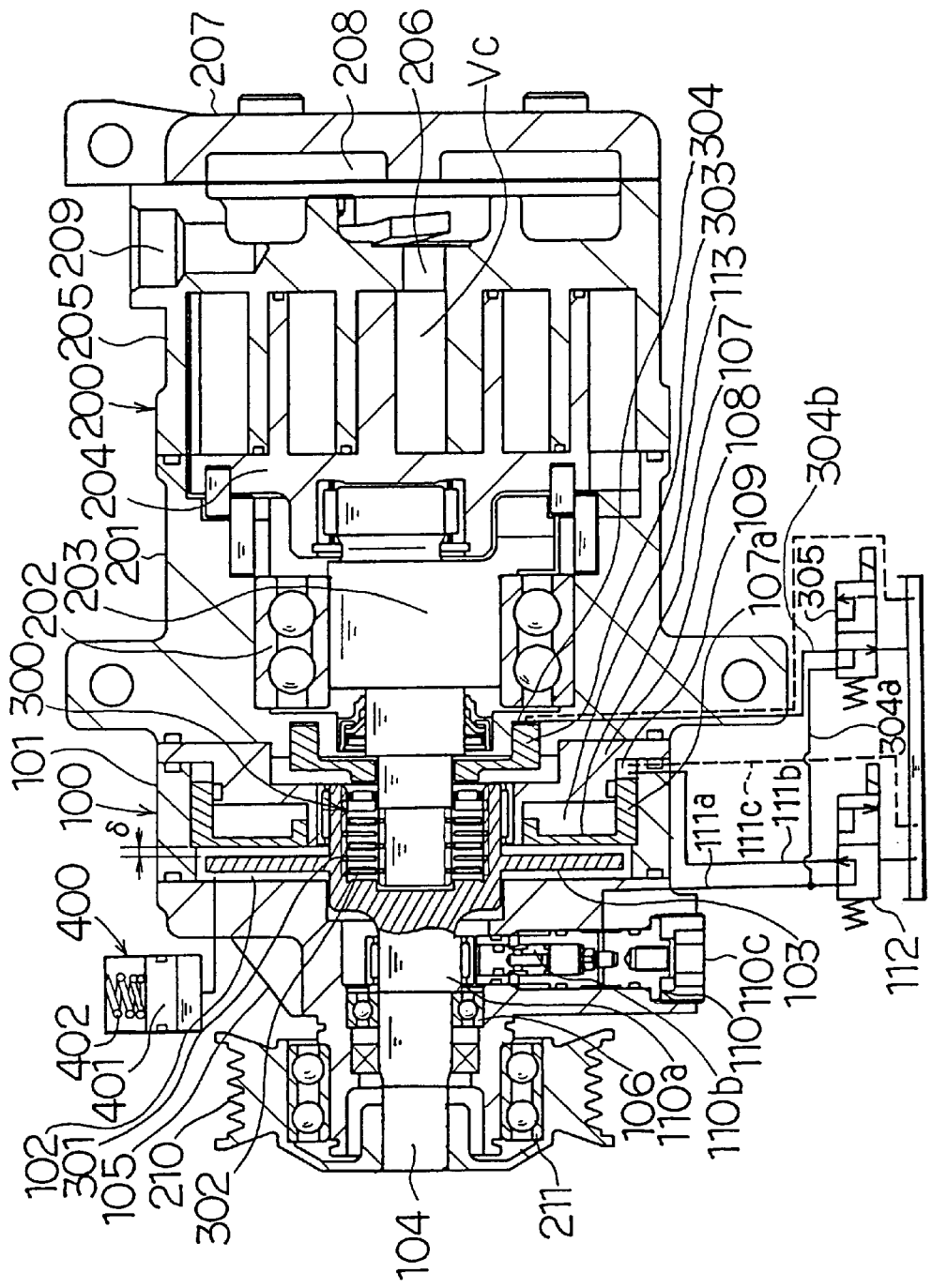
FIG. 1 is a cross-sectional side view of a viscous liquid heater in heating operation according to a first embodiment of the present invention.
Figure 2:
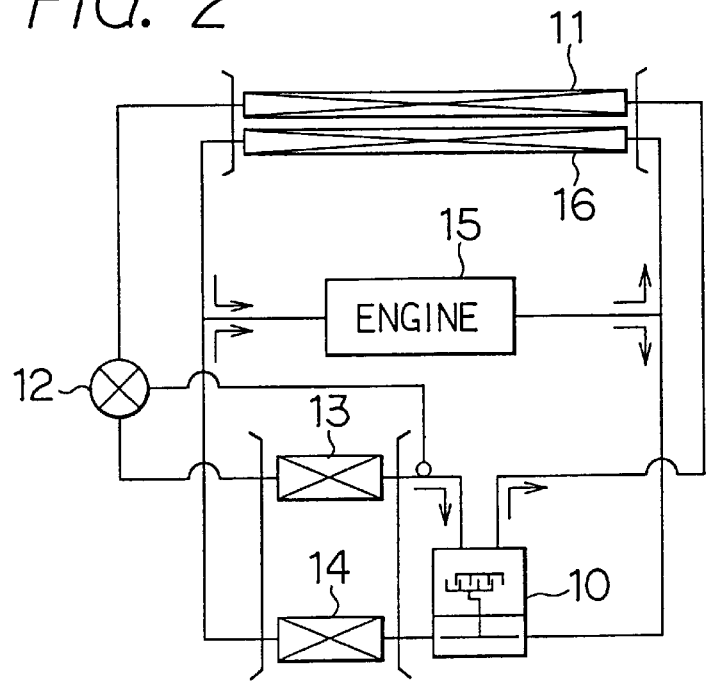
FIG. 2 is a diagram of an air conditioning system.

A viscous liquid heater 10 according to a first embodiment of the invention is described with reference to FIGS. 1–5. Viscous liquid heater 10 is composed of heater section 100 and compressor section 200 as shown in FIG. 1. Viscous liquid heater 10 is installed in a air conditioning system shown in FIG. 2. The air conditioning system is composed of condenser 11, expansion valve 12, evaporator 13 and heater core 14. Condenser 11 cools coolant discharged from compressor section 200 of viscous liquid heater 10, and expansion valve 12 changes valve clearance according to temperature of the coolant at the outlet of evaporator 13. Heater core 14 introduces engine cooling water therein and heats air to be supplied into the passenger compartment of the vehicle, and radiator 16 cools the engine cooling water.

Heater section 100 has heater housing 101 with heat chamber 102 formed therein, disk rotor 103 disposed in heat chamber 102 and first movable plate 107. Silicone oil is filled in heat chamber 102. Heater shaft 104 is integral with rotor 103, which is driven by heater shaft 104. Heater shaft 104 is rotatably supported by bearing 106 fixed in front housing 105. First movable plate 107 is disposed inside heater housing 101 to form an inner wall of heat chamber 102 at the side of compressor section and to be opposed to rotor 103 at an interval δ, so that first movable plate 107 can slide on the inner periphery of heater housing 101 in the direction parallel with heater shaft 104. First movable plate 107 has cylindrical flange 107a defining first control chamber 109 with heater housing 101 and housing plate 108, and hydraulic oil is supplied to first control chamber 109 by oil pressure pump 110 through external pipe 111a, switching valve 112 and external pipe 111b. First control chamber 109 is always connected to a low or atmospheric pressure side through drain pipe 111c which provides much larger pressure-loss than external pipe 111b. Switching valve 112 can switch connection of oil pressure pump 110 and first control chamber 109 by external pipes 111a, 111b to connection of first control chamber 109 and the low pressure side by external pipe 111b. Oil pressure pump 110 is a common type composed of cam 110a formed on heater shaft 104, plunger 110b driven by cam 110a and other related parts. Oil pressure pump 110 is fixed to front housing 105 by bolt 110c, which has a hexagonal engagement hole. Cooling water passage 113 is formed at the side (rear side) of first movable plate 107 opposite to rotor 103 to introduce the engine cooling water therein. The outlet of cooling water passage 113 is connected to heater core 14.

Compressor section 200 is composed of compressor housing 201, bearing 202 fixed in housing 201, compressor shaft 203 rotatably supported by bearing 202, movable scroll 204 disposed inside compressor housing 201, stationary scroll 205 in mesh with movable scroll 204. Stationary scroll 205 is fixed to compressor housing 201, outlet port 206, and rear housing 207. Discharge chamber 208 is formed between stationary scroll 205 and rear housing 207. Outlet 209 is formed at a peripheral portion of stationary scroll 205 to be connected to condenser 11. When movable scroll 204 rotates relative to stationary scroll 205, pump chamber Vc formed between scrolls 204, 205 changes the volume thereof, thereby compressing the coolant (or liquid).

Pulley 210 is fixed to the front end of heater shaft 104 by a bolt. Pulley 210 is supported by front housing 105 via bearing 211 to be driven by engine 15 via a V-belt (not shown).

Clutch 300 is fixed between the rear end of heater shaft 104 and the front end of compressor shaft 203 to switch on or off the connection between two shafts 104, 203, which are coaxial with each other. Clutch 300 is a common multiple disk type composed of a plurality of drive clutch plates 301, driven clutch plates 302 and press member 303. Drive clutch plates 301 engage a spline formed on heater shaft 104 to rotate together with shaft 104, and driven clutch plates 302 engage a spline formed on compressor shaft 203 to rotate together with shaft 203.

Figure 4:
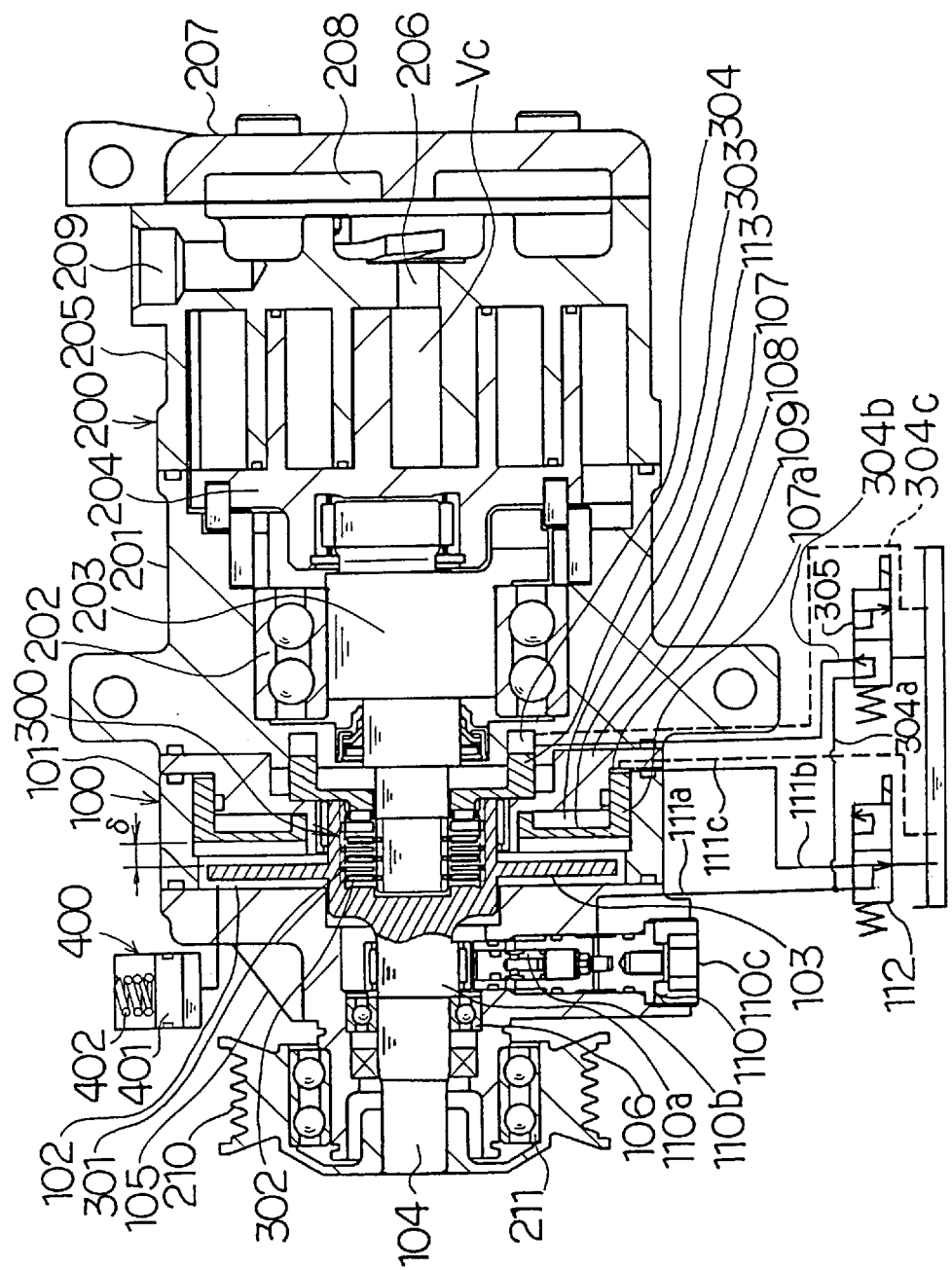
FIG. 4 is a cross-sectional side view of the viscous liquid heater in cooling operation according to the first embodiment.

As shown in FIG. 4, second control chamber 304 is formed between press member 303 and compressor housing 201. Press member 303 presses drive and driven clutch plates 301, 302 by introducing the hydraulic oil into second control chamber 304. Second control chamber 304 is connected to oil pressure pump 110 through external pipe 304a, switching valve 305 and external pipe 304b. The pressure of second control chamber 304 is controlled by switching valve 305 disposed between external pipe 304a and 304b. Second control chamber 304 is always connected to the atmospheric pressure side through drain pipe 304c which provides much larger pressure-loss than external pipe 304b. Reservoir 400 is connected to heat chamber 102. Reservoir 400 is composed of piston and coil spring 402 and always feeds heat chamber 102 with silicone oil. An air spring can be substituted for coil spring 402 if reservoir 400 is made airtight.

Figure 3:
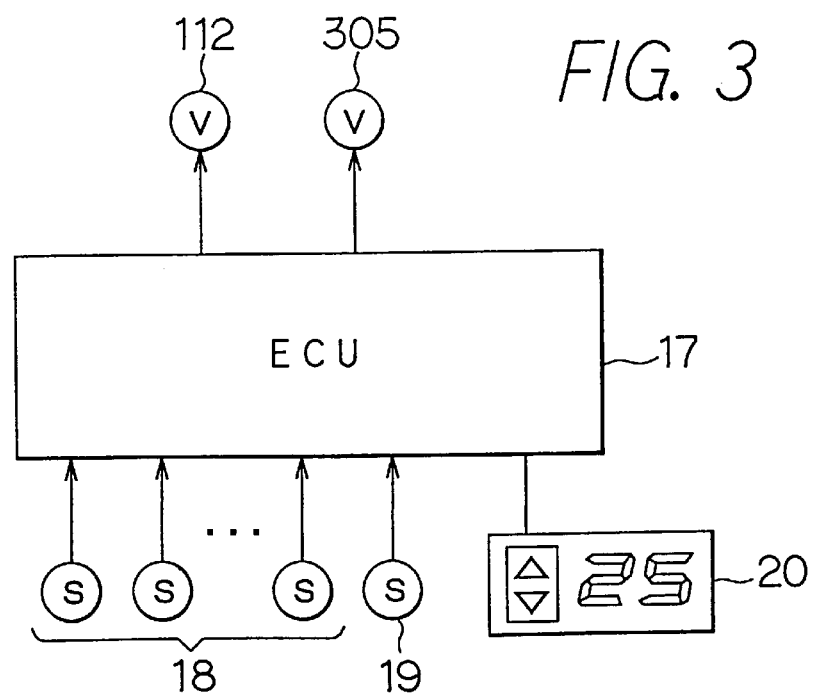
FIG. 3 is a diagram of a control system for the viscous liquid heater according to the first embodiment.

As shown in FIG. 3, switching valves 112, 305 are controlled by ECU (electronically control unit) 17. ECU 17 controls switching valves 112, 305 according to signals of various sensors 18 including a room temperature sensor, an outside temperature sensor and a solar radiation sensor and cooling-water temperature sensor 19.

When viscous liquid heater is started, ECU 17 calculates a target temperature of the air to be supplied to the passenger compartment according to a set value of temperature setting unit 20 and the signals from sensors 18. If the cooling water temperature is too low to heat the air up to the target temperature, ECU 17 sends switching valve 112 a control signal to introduce the hydraulic oil into first control chamber 109 and switching valve 305 a control signal to connect second control chamber 304 to the low pressure side. Oil pressure pump 110 is driven by cam 110a as long as engine 15 operates, and the pressure in first control chamber 109 increases. Accordingly, first movable plate 107 is moved in the direction to reduce gap δ, and the connection between heater shaft 104 and compressor shaft 203 is cut to stop operation of compressor section 200. Thus, shearing force applied to (or frictional heat generated in) silicone oil (or viscous liquid) between rotor 103 and first movable plate 107 increases to increase the temperature of the silicone oil. As a result, cooling water passage 113 disposed in contact with heat chamber 102 is heated to heat the cooling water flowing therethrough. Thus, the air to be supplied to the passenger compartment is heated by the cooling water via heater core 13.

When heater section 100 is stopped and the air conditioning system is started as shown in FIG. 4, ECU 17 calculates a target temperature of the air to be supplied to the passenger compartment according to a set value of temperature setting unit 20 and the signals from sensors 18 in the same manner as stated above. ECU 17 sends switching valve 112 a control signal to connect first control chamber 109 to the low pressure side and sends switching valve 305 a control signal to introduce hydraulic oil into second control chamber 304. Consequently, the pressure in first control chamber 109 decreases, and first movable plate 107 is moved in the direction to increase gap δ because the pressure in the heat chamber 102 (that is controlled by coil spring 402) becomes higher than the pressure in first control chamber 109. Accordingly, the connection between heater shaft 104 and compressor shaft 203 is established to operate compressor section 200. As a result, the shearing force applied to the silicone oil between rotor 103 and first movable plate 107 decreases, and the temperature of the silicone oil decreases. Therefore, the air supplied to the passenger compartment is cooled by evaporator 13.

Figure 5:
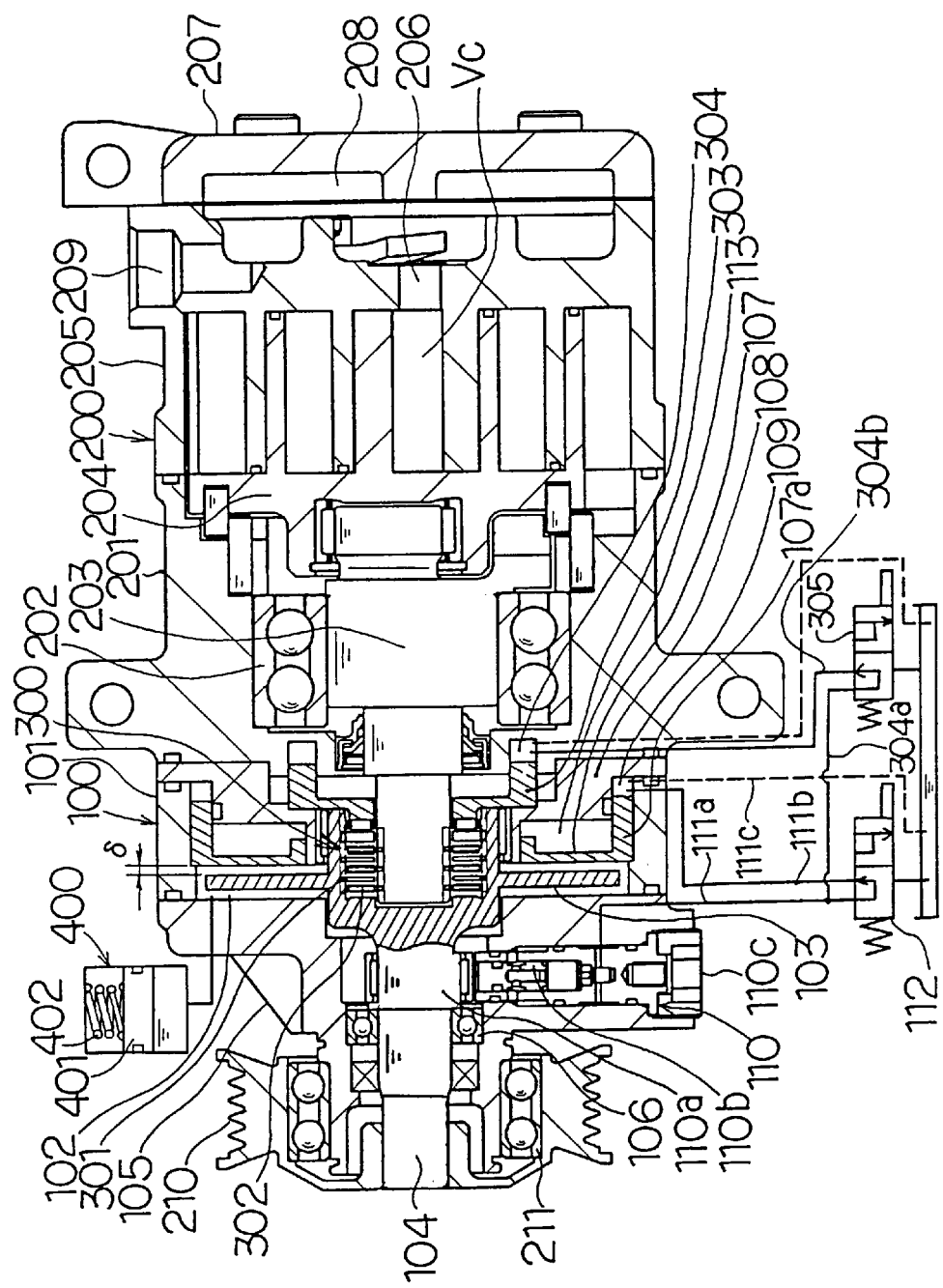
FIG. 5 is a cross-sectional side view of the viscous liquid heater in dehumidifying operation according to the first embodiment of the present invention.

When viscous liquid heater 10 is operated for dehumidification only as shown in FIG. 5, ECU 17 sends switching valves 112, 305 control signals respectively to introduce the hydraulic oil into both control chambers 109, 304. Consequently, the temperature of the silicone oil in heat chamber 102 increases, and compressor section 200 is operated. As a result, the air is cooled and dehumidified by evaporator 13 and heated by heater core 14 that is disposed at the downstream side of evaporator 13.

When heater section 100 and compressor section 200 are stopped, ECU 17 sends switching valves 112, 305 control signals respectively to connect both control chambers 109, 304 to the low pressure side. As a result, the shearing force applied to the silicone oil decreases although rotor 103 is still driven by the engine, and compressor section 200 is disconnected from heater shaft 104.

As a variant of the first embodiment, gas-mixed liquid—air or other gas and the silicone oil are mixed to be used for the viscous liquid—is filled in heater chamber 102. The volume of air mixed with silicone oil under temperature and pressure when heat chamber is not operated is approximately equal to the volume of heat chamber 102 in operation. This is effective to stop generation of heat without increasing gap 6 very much. In other words, the longitudinal size of heater section 100 can be reduced.

When first movable plate 107 is moved to reduce gap δ, the air added in the silicone oil shrinks and gathers in radially inner portion of heat chamber 102 due to difference in the density between the silicone oil and the air, as described later with reference to FIG. 10. Because the heat is mainly generated by the silicone oil in the radially outer portion of heat chamber 102, the air does not affect the heat generation very much. When first movable plate 107 is moved to increase gap δ, the air expands to the radially outer portion of heat chamber 102, as described later with reference to FIG. 11. Thus, the air suppresses the heat generation, and gap δ can be set shorter. In addition, reservoir 400 can be omitted because the air or some suitable gas can provide a certain pressure on the silicone oil in heat chamber 102 instead of reservoir 400 even when first movable plate 107 is moved. An air chamber can be formed radially inside heater shaft 104 to accommodate the air when first movable plate 107 is moved to reduce gap δ.

Second Embodiment

Figure 6:
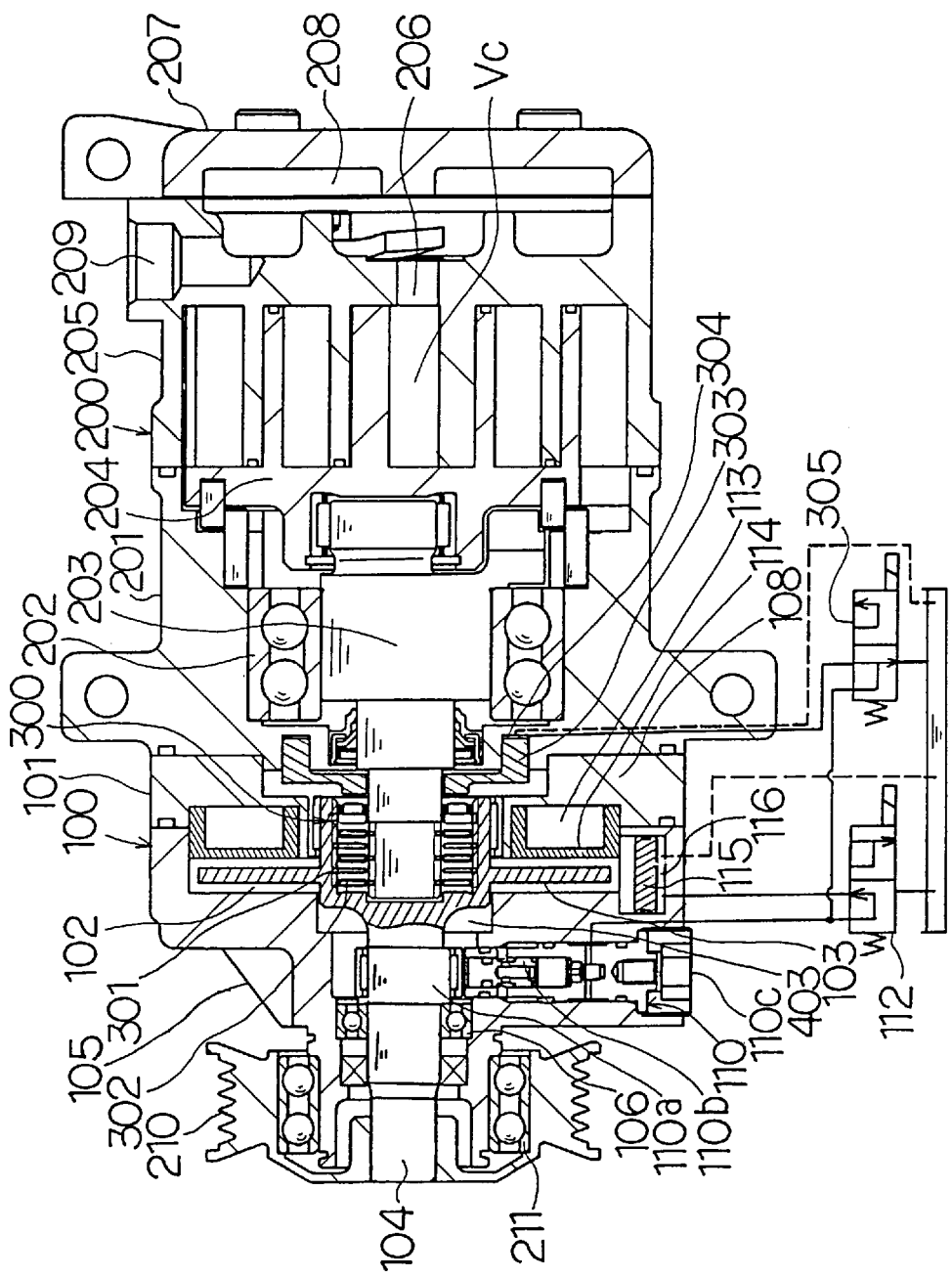
FIG. 6 is a cross-sectional side view of a viscous liquid heater according to a second embodiment of the present invention.

A viscous liquid heater according to a second embodiment of the present invention is described with reference to FIG. 6.

A set of stationary plate 114 and radially movable plate 115 are substituted for first movable plate 107 of viscous liquid heater 10 according to the first embodiment. Radially movable plate 115 is disposed at a portion around heater shaft 104 and forms a part of the inner wall of heat chamber 102, and control chamber 116 is formed at radially outer side of radially movable plate 115. The viscous gas-mixed liquid filled in heat chamber 102 is a mixture of silicone oil and air. Radially movable plate 115 is moved by the hydraulic oil introduced from oil pressure pump 110 into control chamber 116 in the same manner as the first embodiment.

When the viscous liquid heater is started, ECU 17 shown in FIG. 3 sends switching valve 112 a control signal to introduce the hydraulic oil into control chamber 116 to move radially movable plate 115 radially inward to reduce the volume of heat chamber 102 in the same manner as described above. Thus, shearing force applied to silicone oil increases, and the temperature of the gas-mixed liquid increases.

When the viscous liquid heater is stopped, ECU 17 sends switching valve 112 a control signal to connect control chamber 116 to the low pressure side. Consequently, radially movable plate 115 is moved to increase the volume of heat chamber 102. As a result, the air expands to the radially outer portion of heat chamber 102 and suppresses the heat generation.

Third Embodiment

Figure 7:
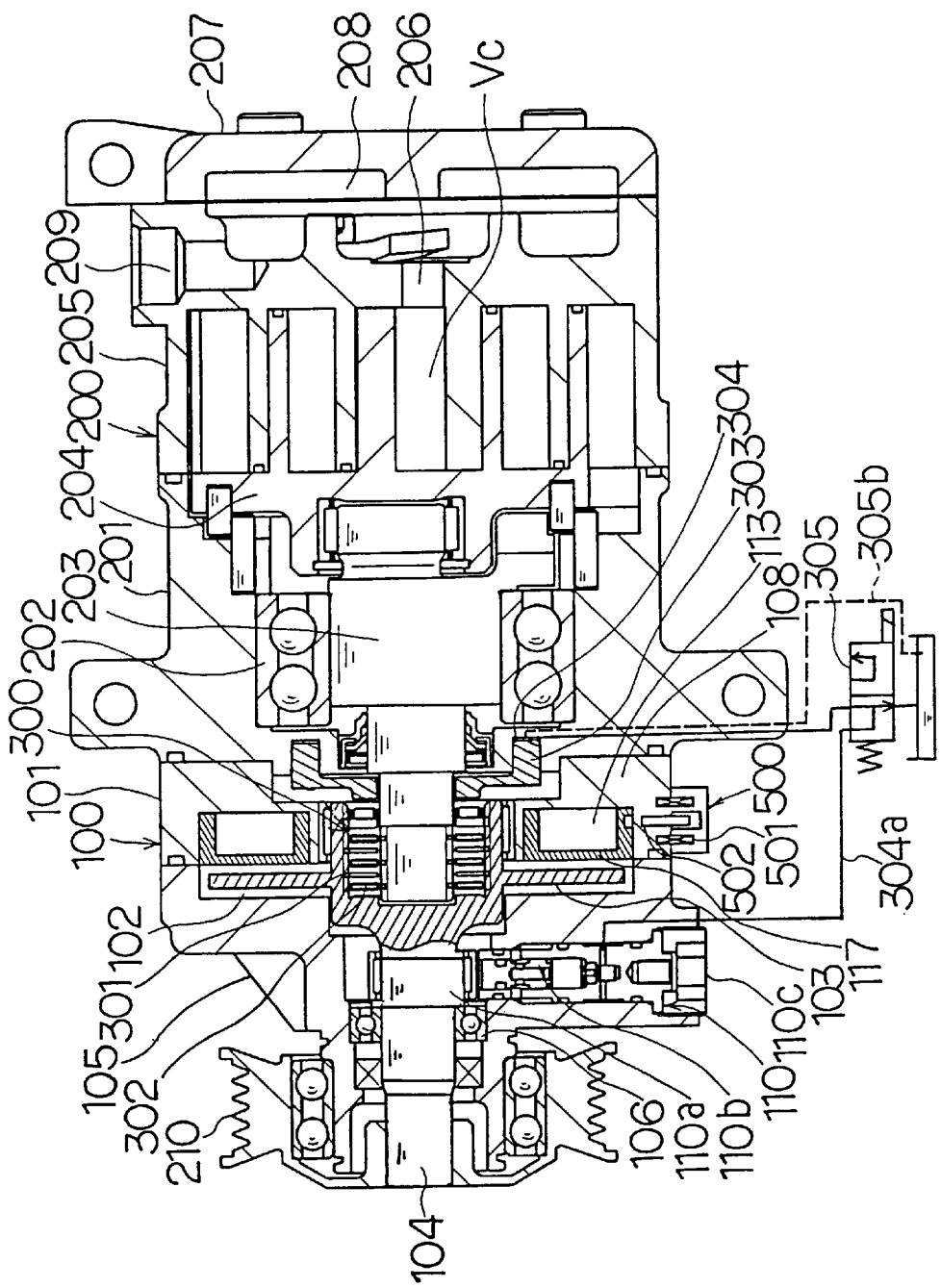
FIG. 7 is a cross-sectional side view of a viscous liquid heater according to a third embodiment of the present invention.

A viscous liquid heater according to a third embodiment of the invention is described with reference to FIG. 7. First movable plate 107 of heater section 100 according to the first embodiment can be substituted by rotary plate 117 disposed at substantially the same position as first movable plate 107. Rotary plate 117 is rotatably disposed on the inner periphery of heater housing 101 and is not linked to heater shaft 104 directly. Stopper mechanism 500 is also disposed at a portion around rotary plate 117. Stopper mechanism 500 is composed of exciting coil 501 and plunger 502 driven by exciting coil and controlled by ECU 17 shown in FIG. 3.

When the viscous liquid heater is started, ECU 17 sends stopper mechanism 500 a control signal to stop rotary plate 117. Consequently, shearing force applied to silicone oil increases, and the temperature of the silicone oil increases.

When the viscous liquid heater is stopped, ECU 17 sends stopper mechanism 500 a control signal to allow rotation of rotary plate 117. Consequently, the shearing force decreases, and the temperature of the silicone oil decreases.

Fourth Embodiment

Figure 8:
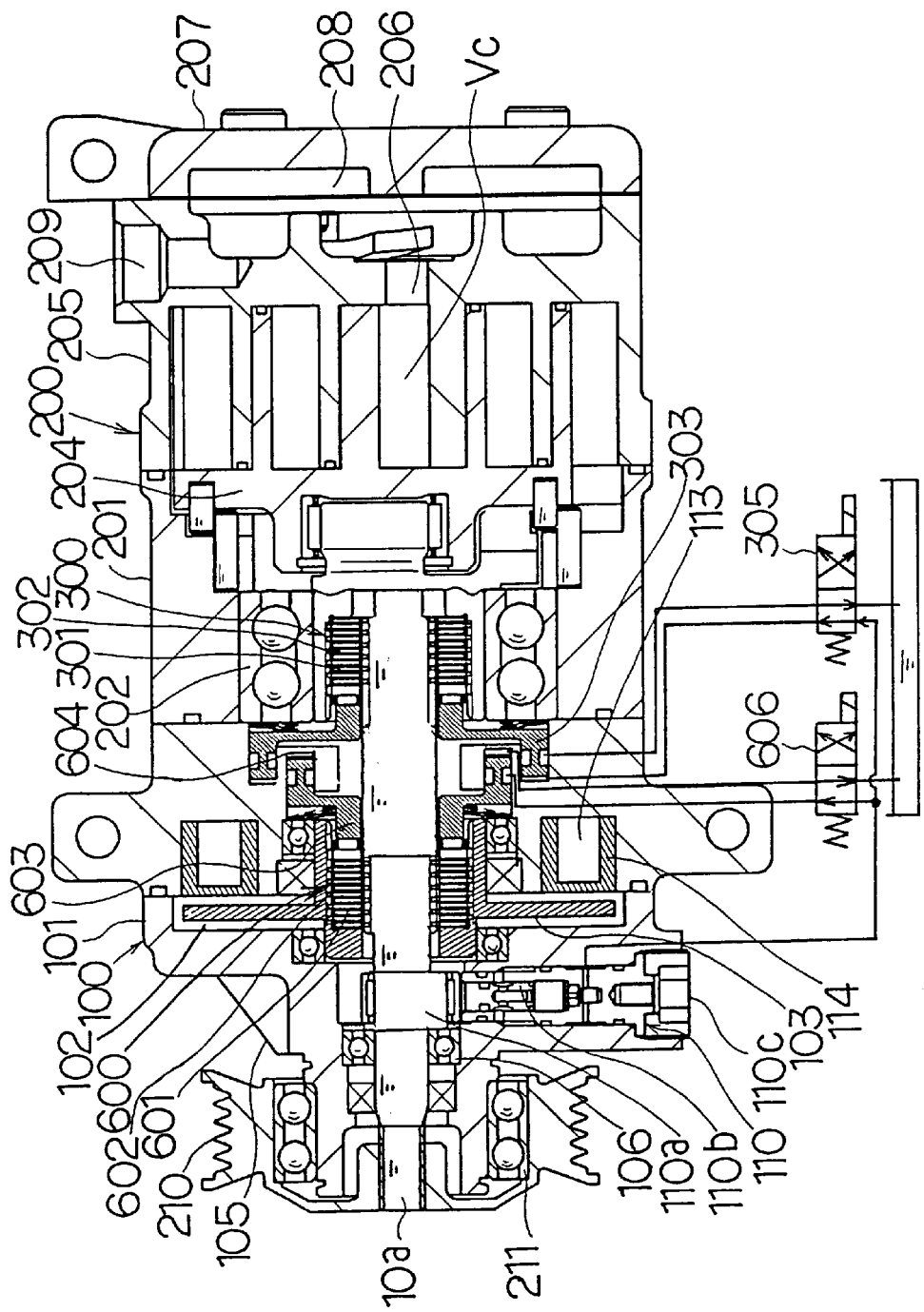
FIG. 8 is a cross-sectional side view of a viscous liquid heater according to a fourth embodiment of the present invention.

A viscous liquid heater according to a fourth embodiment of the invention is described with reference to FIG. 8.

Heater shaft 104 and compressor shaft 203 are formed into a unitary shaft 10a, and heater clutch 600 is disposed between heater housing 101 and front housing 105. Compressor clutch 300 is fixed between the rear end of unitary shaft 10a and the front end of a compressor shaft in substantially the same manner as the previous embodiments. Heater clutch 600 is a common multiple disk type composed of a plurality of drive clutch plates 601, driven clutch plates 602 and press member 603. Drive clutch plates 601 are fixed to the outer periphery of shaft 10a respectively in the longitudinal direction thereof, and driven clutch plates 602 are fixed to rotor 103. Press member 603 is driven by hydraulic oil supplied to control chambers 605, 606 via switching valve 606 that is controlled by ECU 17.

When the viscous liquid heater is started, ECU 17 sends switching valve 606 a control signal to introduce hydraulic oil into control chamber 604 from oil pressure pump 110. Consequently, drive clutch plates 601 and driven clutch plates engages with each other to rotate rotor 103. Thus, shearing force applied to silicone oil increases, and the temperature of the silicone oil increases.

When the viscous liquid heater is stopped, ECU 17 sends switching valve 606 signal to connect control chamber 604 to the low pressure side. Consequently, drive clutch plates 601 and driven clutch plates separate from each other to stop rotor 103. Thus, shearing force applied to silicone oil disappears, and the temperature of the silicone oil decreases.

Fifth Embodiment

Figure 9:
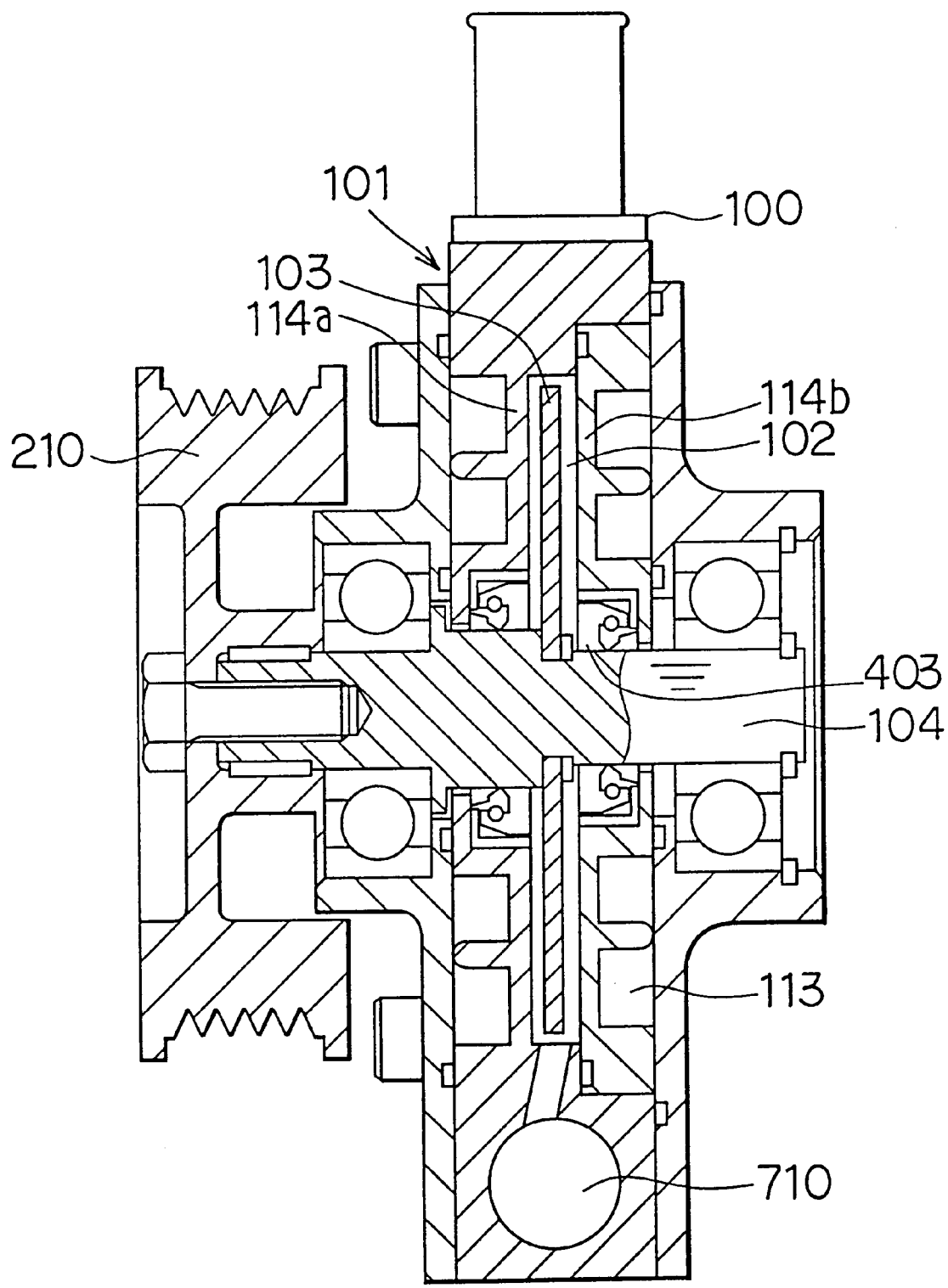
FIG. 9 is a cross-sectional side view of a viscous liquid heater according to a fifth embodiment of the present invention.

A viscous liquid heater according to a fifth embodiment of the invention is described with reference to FIGS. 9–11.

Heater housing 101 and housing plate 108 of heater section 100 of the above described embodiment are substituted by heater housing 114a and housing plate 114b to provide heat chamber 102. A liquid reservoir 710 is formed in heater housing 114a at a portion thereof around heat chamber 102 to be connected to heat chamber 102. Heat chamber 102 contains the gas-mixed liquid. As shown in FIGS. 10 and 11, reservoir 710 has piston 711 which is driven by pressure air supplied from air pump 110b through switching valve 112. Piston can be driven by a coil spring or air spring also.

Figure 10:
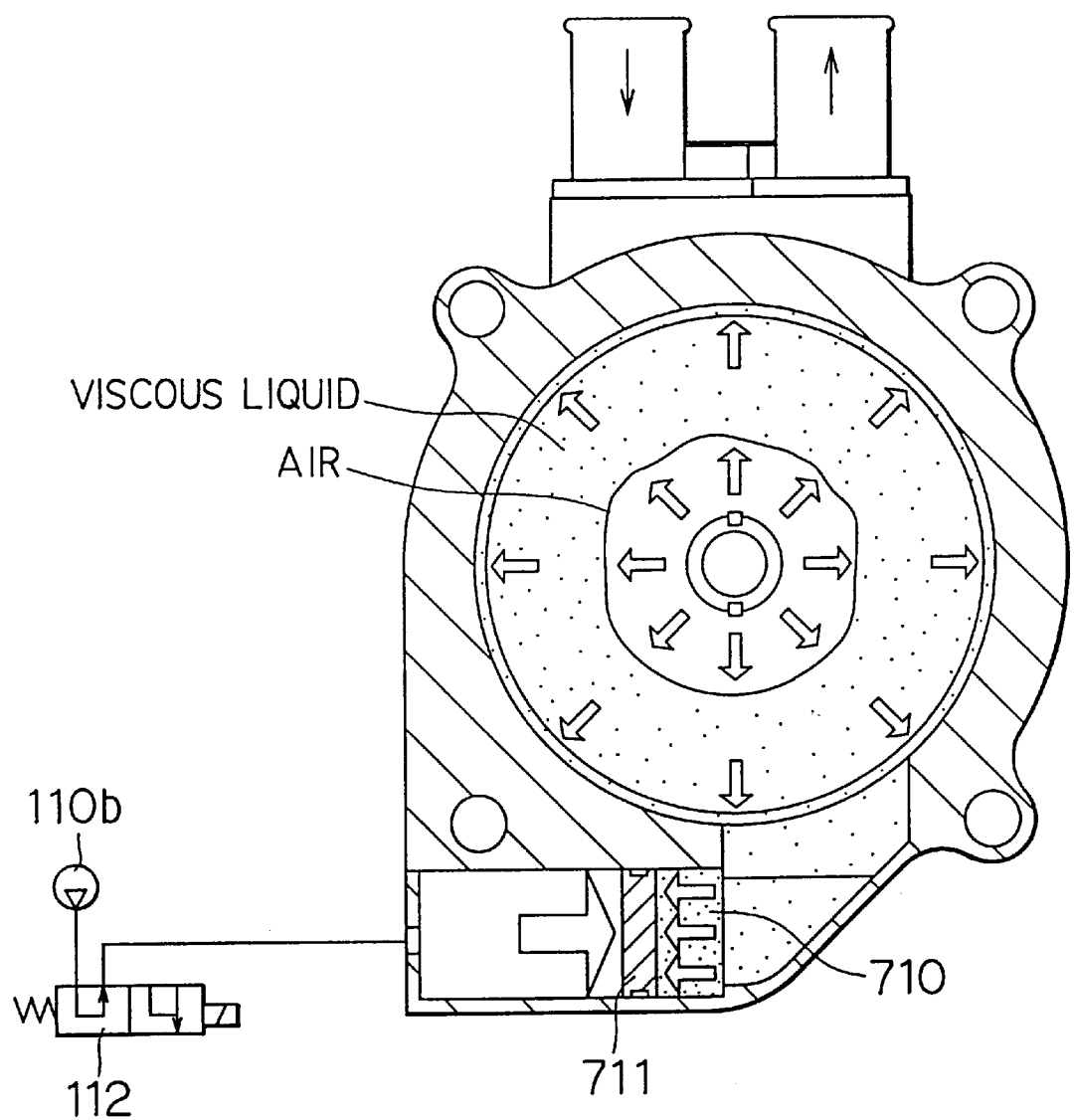
FIG. 10 is a cross-sectional side view of a heater section of the viscous liquid heater according to the fifth embodiment.

When rotor 103 is rotated gradually, the silicone oil moves radially outward and the air mixed in the silicone oil moves radially inward due to the centrifugal force exerting on the silicone oil, so that the silicone forms a doughnut as shown in FIG. 10.

Figure 11:
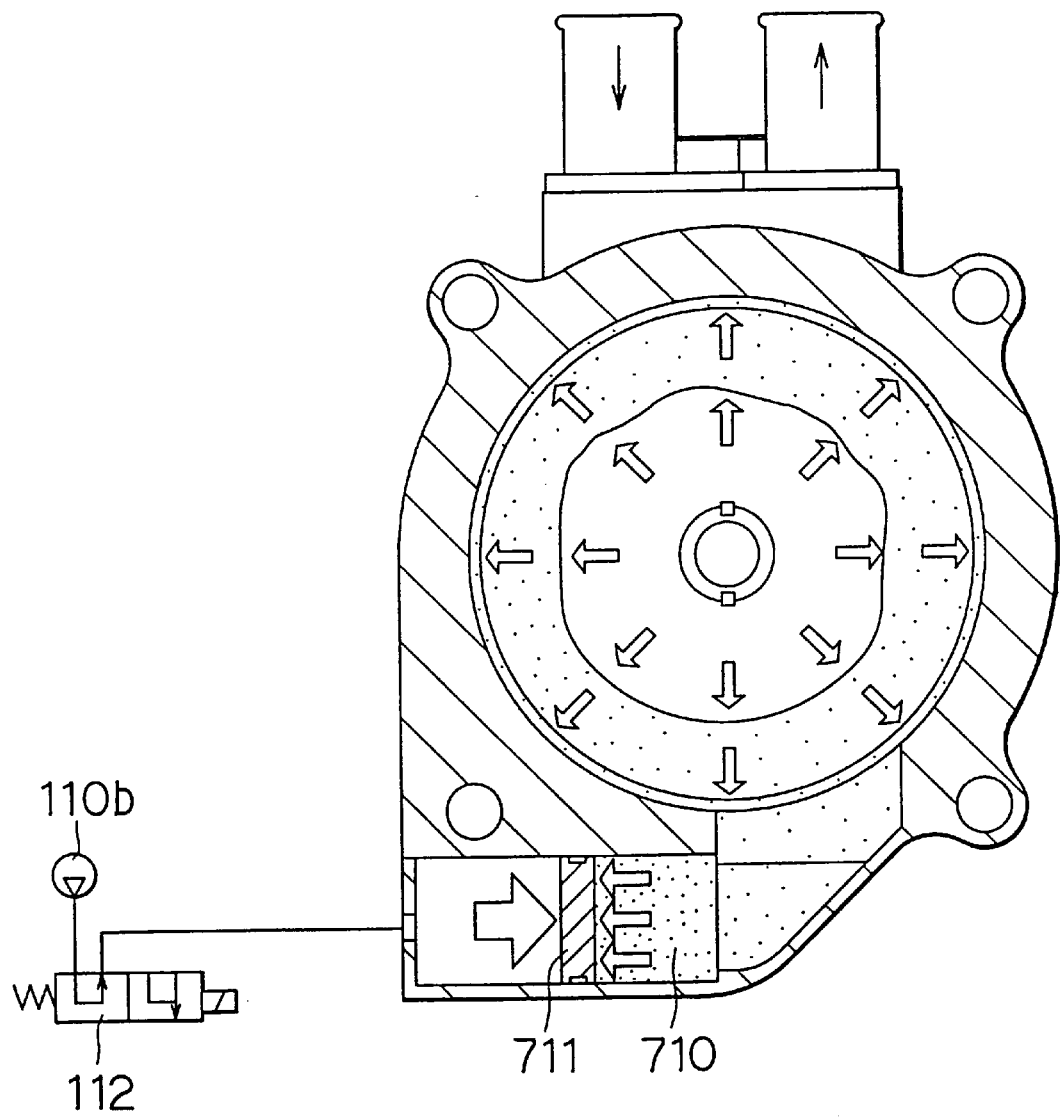
FIG. 11 a cross-sectional front view of the heater section of the viscous liquid heater according to the fifth embodiment.

When rotation speed of rotor 103 becomes higher than a certain speed, the silicone oil further moves radially outward and the air expands so that the inside diameter of the doughnut increases as shown in FIG. 11. Consequently, the contact surface of the rotor with the silicone oil decreases to moderate abrupt increase in the heat generation although the shearing force increases. This also causes piston 711 to move in the direction to expand the volume of reservoir 710 until the pressures on opposite sides of piston 711 become equal.

Thereafter, if the rotation speed becomes lower, the inside diameter of the donut decreases due to decrease in the centrifugal force, while the outside diameter remains as it is due to the viscosity thereof. Consequently, the contact surface of the rotor with the silicone oil increases to moderate abrupt decrease in the heat generation although the shearing force decreases.

Sixth Embodiment

A viscous liquid heater according to a sixth embodiment is described with reference to FIGS. 12–14.

Centrifugal pump 103c is formed in heater section 100. A plurality of slots 103a are formed on the outer periphery thereof, and cylindrical casing 103b is fixed inside heater housing 114a and housing plate 114b. Cylindrical casing 10b has outlet 103d and inlet 103e. Outlet 103d is such a small orifice that a sufficient pressure loss can be provided to generate heat.

Figure 12:
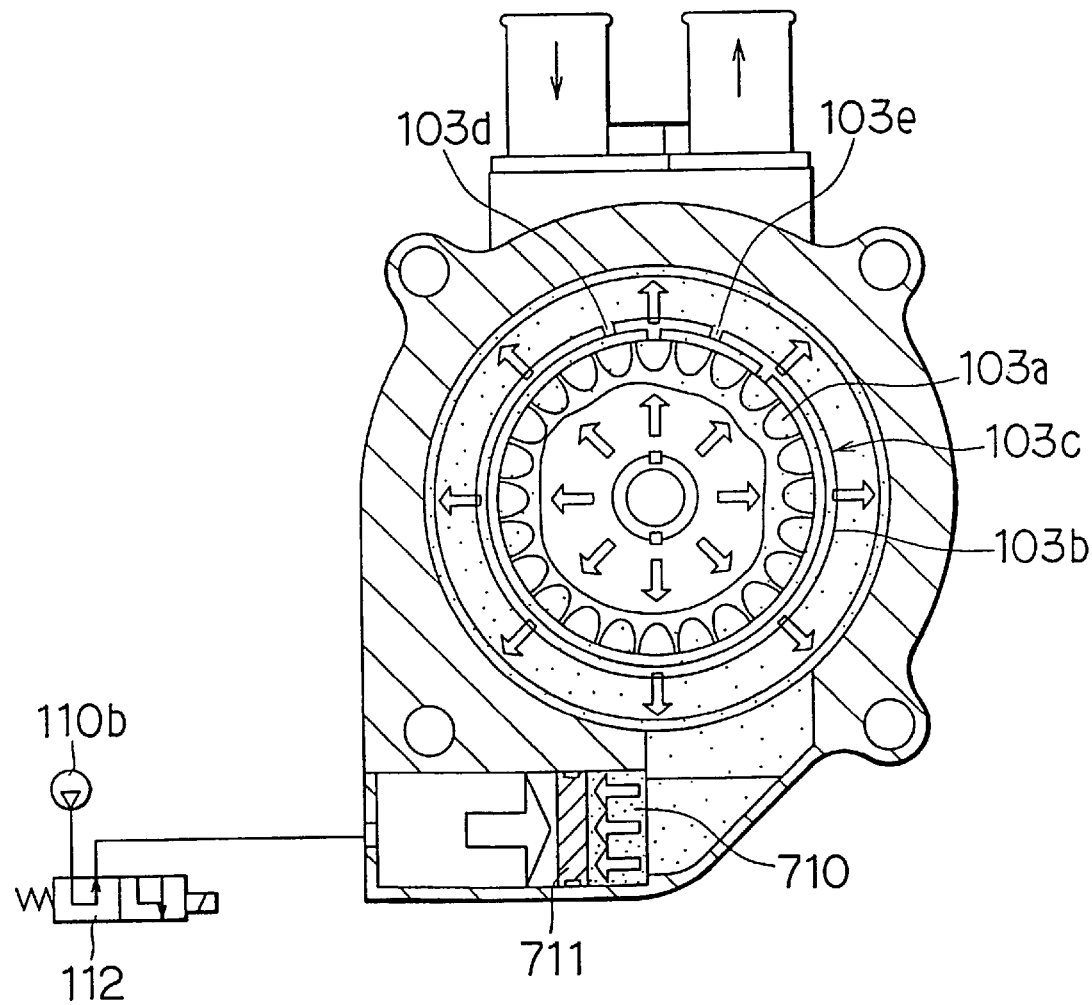
FIG. 12 is a cross-sectional front view of the heater section of the viscous liquid heater according to a sixth embodiment of the present invention.
Figure 13:
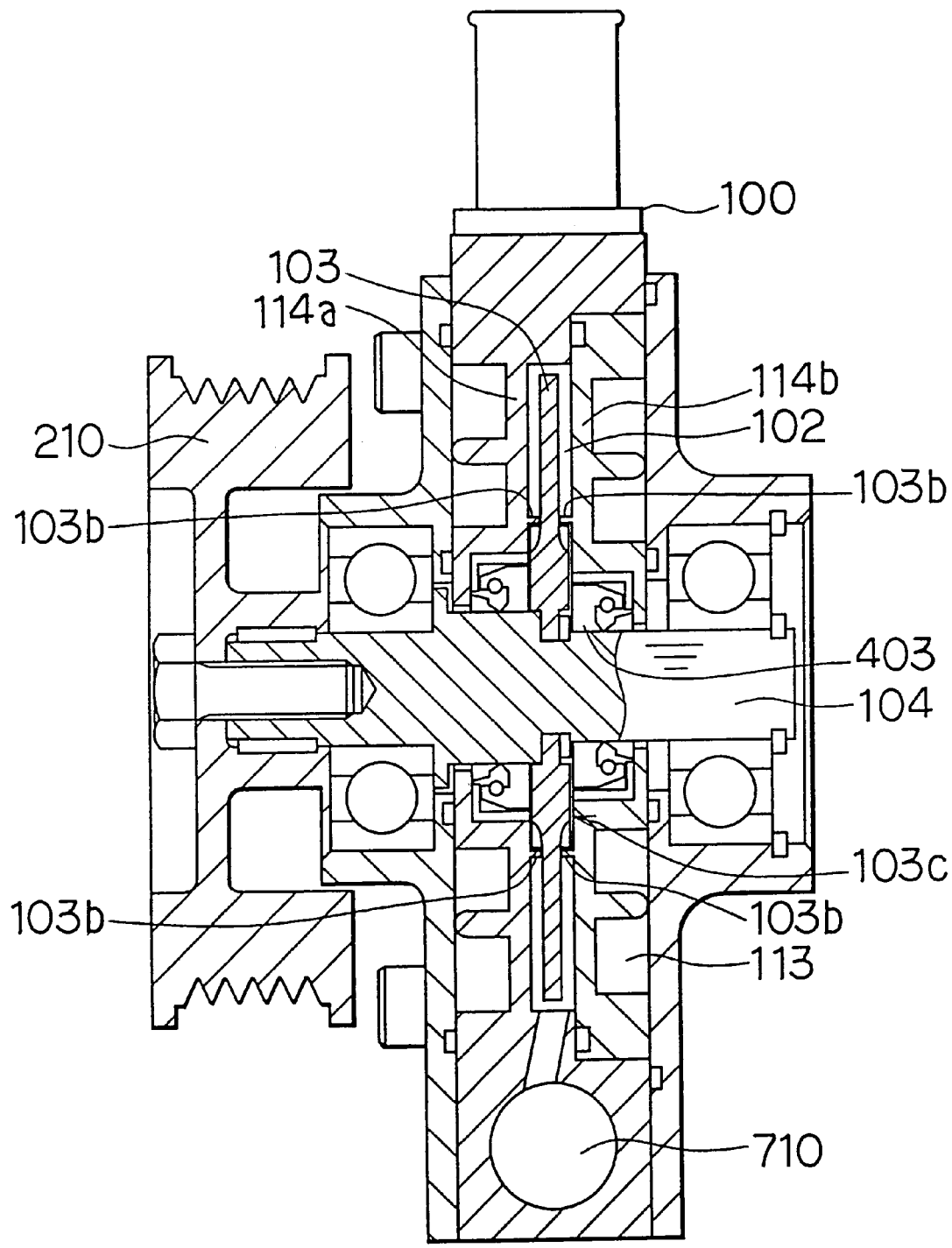
FIG. 13 is a cross-sectional front view of heater section of a viscous liquid heater according to the sixth embodiment.

When rotor 103 is rotated gradually, the silicone oil moves radially outward and the air mixed in the silicone oil moves radially inward due to the centrifugal force exerting on the silicone oil as shown in FIG. 12. The silicone oil pumped out of heat chamber 102 through inlet 103e is pumped into heat chamber 102 again through outlet 103d. While the silicone oil passes through outlet 103d, heat is generated due to the pressure loss thereof. That is, heat is generated due to both the shearing force applied to the silicone oil in heat chamber 102 and the pressure loss of the silicone oil flowing through outlet 103d.

Figure 14:
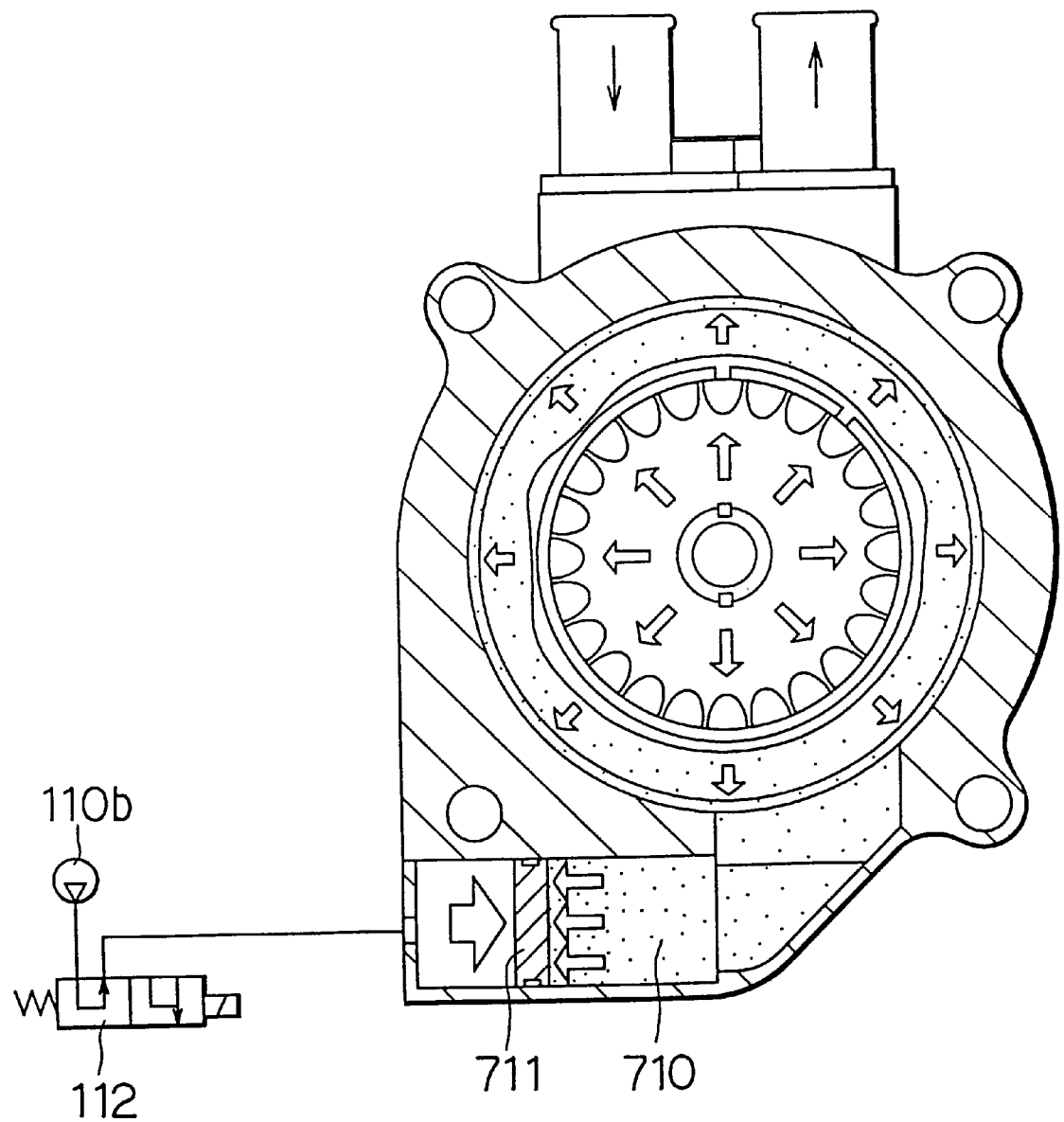
FIG. 14 is a cross-sectional side view of the viscous liquid heater according to the sixth embodiment.

When rotation speed of rotor 103 becomes higher than a certain speed, the silicone oil further moves radially outward and the air expands so that the silicone oil can not be pumped by centrifugal pump 103c as shown in FIG. 14. Thus, the heat is only generated in heat chamber 102. Consequently, abrupt increase in the heat generation due to increase of the shearing force can be moderated. This also causes piston 711 to move in the direction to expand the volume of reservoir 710 until the pressures on opposite sides of piston 711 become equal to each other.

Thereafter, if the rotation speed becomes lower, centrifugal pump operates again to generate the heat due to decrease in the centrifugal force, while the outside portions of the silicone remains in heat chamber due to the viscosity thereof. Consequently, abrupt decrease in the heat generation can be moderated although the shearing force decreases.

As a result, a compact viscous liquid heater can be provided.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A viscous liquid heater comprising:
   a housing having a heat chamber, said heat chamber having a prescribed volume therein;
   a mixture of a viscous liquid material and a gas disposed in said heat chamber, said gas defining a gas volume;
   a drive shaft;
   a rotor, connected to said drive shaft and rotatably disposed in said heat chamber, for shearing said viscous liquid material, thereby generating heat; and
   means, disposed in said heat chamber, for causing said volume of said gas to reduce and gather in a radially inner portion of said heat chamber thereby changing a shearing relationship between said heat chamber and said viscous liquid material.

2. The viscous liquid heater as claimed in claim 1, wherein
   said means for changing shearing relationship is disposed at an axial end of said heat chamber to be movable in the axial direction.

3. The viscous liquid heater as claimed in claim 1, wherein
   said, causing means is disposed at a radially outer portion of said heat chamber to be movable in the radial direction.

4. The viscous liquid heater as claimed in claim 1 further comprising a fluid pump for supplying fluid pressure, wherein
   said means for changing shearing relationship comprises a member moving according to said fluid pressure.

5. The viscous liquid heater as claimed in claim 1 further comprising means, connected to said heat chamber, for reserving said viscous liquid.

6. The viscous liquid heater as claimed in claim 5, wherein
   said means for reserving comprises a reservoir member for reserving said viscous liquid, a movable wall member for changing volume of said reservoir member and means for driving said movable member.

7. The viscous liquid heater as claimed in claim 6, wherein
   said means for driving said movable member comprises a spring member.

8. The viscous liquid heater as claimed in claim 7, wherein
   said spring member comprises a coil spring.

9. The viscous liquid heater as claimed in claim 1 further comprising a pump unit, disposed in said heat chamber and connected to said drive shaft, for generating heat by pumping said viscous liquid out of said heat chamber and into the same repeatedly.

10. The viscous liquid heater as claimed in claim 9, wherein
    said pump unit comprises a centrifugal pump, an outlet member and an inlet member, and
    one of said outlet and inlet members provides a pressure loss sufficient to generate heat for said heater when said viscous liquid passes therethrough.

11. The viscous liquid heater as claimed in claim 1 further comprising a compressor for an air conditioner, a clutch connected between said rotor and said compressor and means for controlling said clutch.

12. The viscous liquid heater as claimed in claim 11, wherein
    said compressor is disposed coaxial with said drive shaft around the same.

13. The viscous liquid heater as claimed in claim 1, wherein said gas volume is approximately equal to said prescribed volume when said heater is not operated.

14. A viscous liquid heater comprising:
    a housing having a heat chamber, said heat chamber having a prescribed volume therein;
    a mixture of a viscous liquid material and a gas disposed in said heat chamber, said gas defining a gas volume;
    a drive shaft;

a disk rotor, connected to said drive shaft and rotatably disposed in said heat chamber, for shearing said viscous liquid material, thereby generating heat; and a movable plate forming an inner wall of said chamber movable in parallel with said drive shaft to change said prescribed volume, thereby changing a shearing relationship between said heat chamber and said viscous liquid material, whereby said gas volume reduces and gathers in a radially inner portion of said heat chamber when said movable plate is moved to reduce said prescribed volume.

15. The viscous liquid heater as claimed in claim 14, wherein said gas volume is approximately equal to said prescribed volume when said heater is not operated.

* * * * *